Nov. 5, 1963  R. F. LO PRESTI  3,109,534
SUSPENSION MEANS FOR TROUGHING IDLER ASSEMBLY
Filed Jan. 5, 1961  2 Sheets-Sheet 2
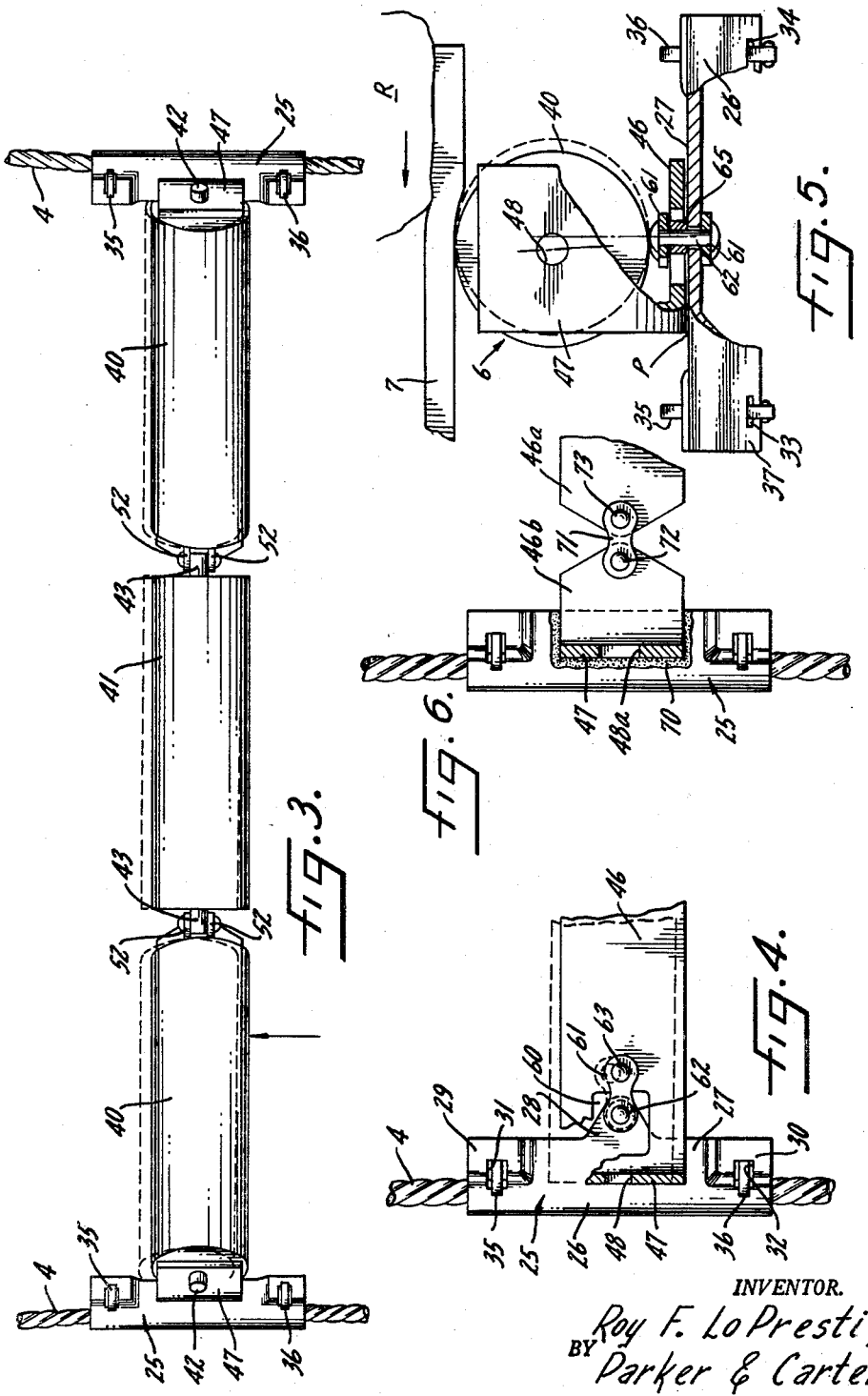
INVENTOR.
Roy F. LoPresti,
BY Parker & Carter
Attorneys.

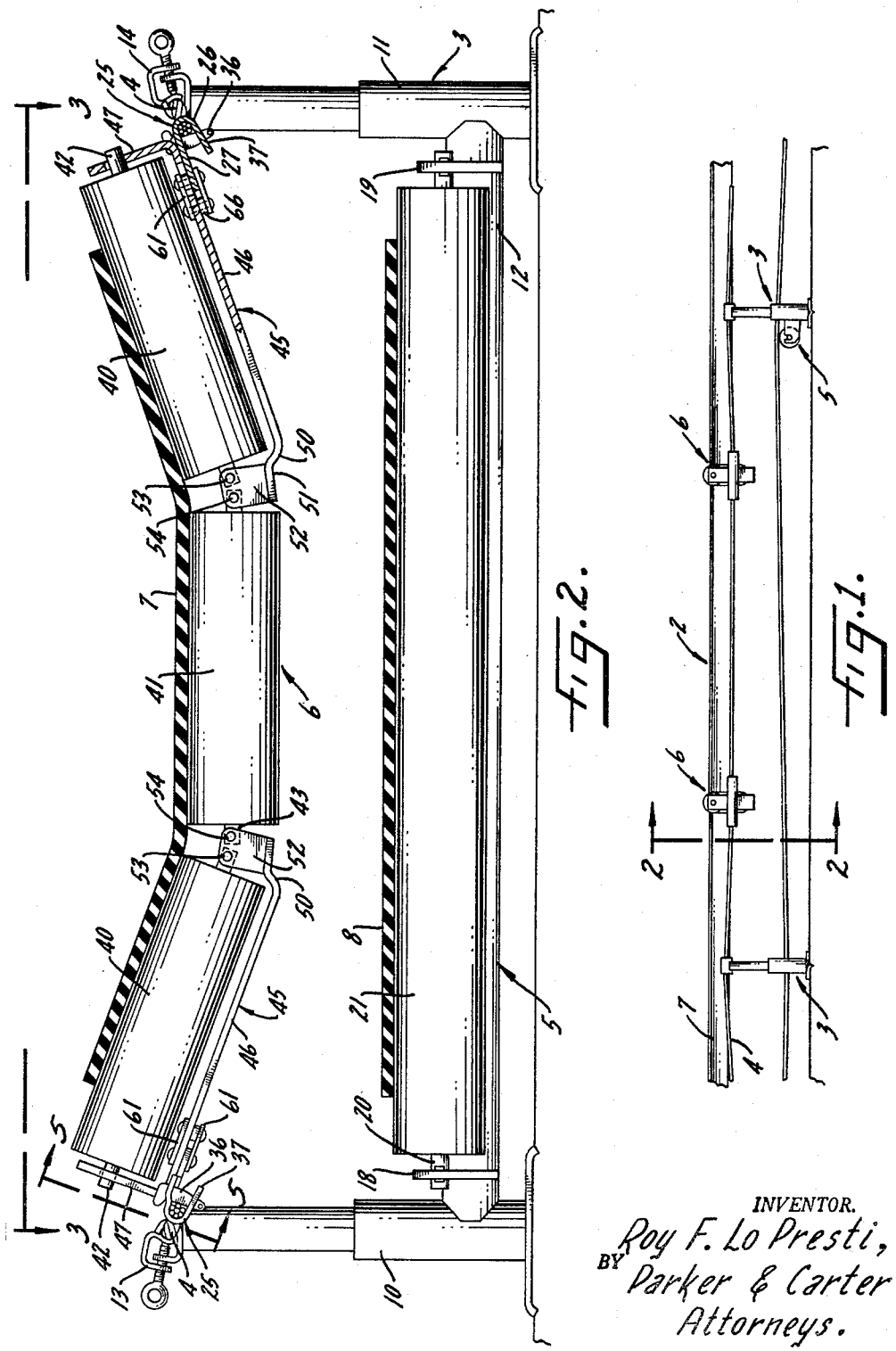

United States Patent Office 3,109,534
Patented Nov. 5, 1963

3,109,534
SUSPENSION MEANS FOR TROUGHING
IDLER ASSEMBLY
Roy F. Lo Presti, Chicago, Ill., assignor to Goodman
Manufacturing Company, Chicago, Ill., a corporation
of Illinois
Filed Jan. 5, 1961, Ser. No. 80,869
9 Claims. (Cl. 198—192)

This invention relates in general to flexible sideframe conveyors and more particularly to a new and improved full-flex idler assembly for such a conveyor.

Flexible sideframe conveyors, and particularly the low rope conveyor, have found wide use under conditions where limited head room is available, as for example in narrow seam coal mines. In such environments, the troughing movement of the assembly is often modified by providing wing roller supporting brackets rigidly secured at their outermost extremities to corresponding side ropes. The brackets support the wing rollers above the ropes. The center roller is normally carried between the inner ends of opposed brackets.

Idler assemblies of this type are sometimes provided with horizontally extending slots in the outer ends of the supporting brackets. These slots are adapted to carry the outer ends of the wing roller dead shafts and facilitate movement of the outer ends of the wing rollers in the direction of belt travel. Such a construction provides automatic belt training in either direction of belt travel.

Such idler assemblies are able to withstand constant vertical impact or shock loads without damage to the conveyor in general or the idler assemblies in particular. Occasionally, however, constant horizontal loading and sudden or severe shock loads in a horizontal plane may have detrimental effects. It is these horizontal loadings and severe horizontal shock loads with which this invention is primarily concerned.

These horizontal shock loads often bend and spread the dead shaft supporting ears on the supporting brackets. They create bending moments which enlarge and deform joint pin carrying holes. Joint pins are frequently bent by these forces, cotter pins sheared and occasionally roller supporting dead shafts bent. The wear and damage occurs primarily at the inner ends of the supporting brackets where their upwardly extending ears pivotally support adjoining ends of the center and wing roller dead shafts.

Accordingly, it is a primary object of this invention to provide a fully flexible idler assembly capable of carrying heavy loads without damage or substantial wear.

Another object is to provide an idler assembly which readily withstands severe horizontal shock loads without damage or substantial wear.

Still another object is to increase the service life of fully flexible idler assemblies.

A further object is to provide a fully flexible idler assembly which substantially eliminates damaging bending moments induced by the wire rope supports and horizontal loading.

Another object is to provide a fully flexible idler assembly which substantially eliminates bent and spread wing roller supporting bracket ears, bent pivot pins, worn and enlarged pivot holes and bent roller supporting dead shafts.

Still another object is to provide an idler assembly of the aforedescribed character which automatically induces a degree of belt training.

These and other objects of this invention will be found in the following specification and claims wherein like reference numerals identify like parts throughout.

The invention is illustrated more or less diagrammatically in the drawings wherein several embodiments are shown:

FIGURE 1 is a side elevation of a flexible sideframe conveyor including idler assemblies embodying this invention, FIGURE 2 is a view taken along line 2—2 of FIGURE 1, FIGURE 3 is a view taken along line 3—3 of FIGURE 2, FIGURE 4 is an enlarged view of a portion of the idler assembly as seen in FIGURE 3, with a wing roller and other parts broken away, FIGURE 5 is a view taken along line 5—5 of FIGURE 2, and FIGURE 6 is a view similar to that shown in FIGURE 4 showing an alternate form of this invention.

A flexible sideframe conveyor of the low rope type is shown generally at 2 in FIGURE 1. Conveyor 2 includes a series of generally regularly spaced support stands 3, of which two are shown in FIGURE 1. A pair of longitudinally extending spaced side ropes 4 are supported by the stands 3. A conventional return roller assembly 5 is shown mounted on alternate support stands. Flexible idler assemblies 6 embodying this invention are suspended at generally regularly spaced intervals between the side ropes 4 along the conveyor. The idler assemblies 6 support the carrying reach 7 of a conveyor belt while the return roller assembly 5 supports the return reach 8.

FIGURE 2 shows a somewhat detailed view of a single support stand 3, which in this instance is carrying a return roller assembly 5 and its associated side ropes 4. An assembly 6 of the type embodying this invention is shown suspended between the side ropes 4.

Each support stand 3 includes two vertically adjustable standards 10 and 11 connected by cross bar 12. Rope clamps 13 and 14, secured by welding or the like to the upper extremities of the standards 10 and 11 secure the ropes to the stand 3. Rope clamps 13 and 14 form no part of this invention and consequently will not be described in detail.

Return roller assembly 5 includes ears 18 and 19 which are secured to the cross bar 12 of the stand 3 by welding or the like. The ears 18 and 19 each contain a slot on its upper edge in transverse alignment and these slots receive the opposite ends of dead shaft 20. Dead shaft 20 carries return roller 21 which supports the return reach 8 of the conveyor belt.

As best seen in FIGURES 2-5, each idler assembly 6 includes a pair of elongated rope clamps 25 seated on corresponding wire ropes 4. The clamps are identical in construction and consequently only one will be described. Each clamp 25 includes a U-shaped plate 26 adapted to overlie a corresponding rope 4. The upper leg 27 of U-shaped plate 26 has a generally triangular extension 28 protruding inwardly therefrom. Raised flat portions 29 and 30 are formed at either end of upper leg 27. Wedge receiving slots 31 and 32 extend through the leg 27 adjacent the boundaries of the raised portions. The lower leg 37 of each of the U-shaped plates 26 is slotted as at 33 and 34 in general alignment with the slots 31 and 32 in the upper leg 27. Wedges 35 and 36 are driven into corresponding pairs of slots to rigidly secure each rope clamp to its associated side rope 4.

Idler assembly 6 further includes a pair of wing rollers 40 and a center roller 41 forming a roller assembly. Wing rollers 40 are mounted for rotation upon dead shafts 42 while center roller 41 is mounted for rotation about dead shaft 43. Wing roller supporting brackets 45, of identical construction, connect and support the dead shafts 42 and 43, as seen in FIGURE 2, and are operatively connected, in a manner which will be hereinafter described, to the rope clamps 25.

Each supporting bracket 45 includes a flat base plate 46 underlying a corresponding wing roller 40 and an outer end wall 47 extending upward perpendicularly therefrom. A bearing hole 48 is provided in each end wall 47 for receiving the outer ends of dead shafts 42 supporting each wing roller 40. The inner end of each bracket 45 is upwardly curved, as at 50, to provide a mounting platform 51 for vertically extending ears 52. Opposed ears 52 have pivot pins 53 and 54 extending therethrough supporting the inner ends of dead shafts 42 and the ends of dead shaft 43, respectively.

FIGURE 4 best illustrates the articulated connection between wing roller supporting brackets 45 and corresponding elongated rope clamps 25. Each base plate 46 is provided with a cutout 60 adjacent its upturned end wall 47. The outer end of each base plate 46 overlies the upper leg 27 of a corresponding rope clamp 25 in sliding relation therewith such that the triangular extension 28 underlies each cutout 60. A pair of pitch links 61 are pivotally connected to each extension 28 and a base plate 46, as by pivot pins 62 and 63, respectively, to establish a movable connection between the wing roller supporting brackets 45 and the rope clamps 25. As best seen in FIGURE 5, a spacer 65 surrounds pivot pin 62 to maintain proper separation between upper link 61 and the upper leg 27 of plate 26, while FIGURE 2 best illustrates the spacer 66 which maintains proper separation between bottom link 61 and the bottom of base plate 46.

An alternative form of this invention is shown in FIGURE 6 of the drawings. In this embodiment the base plate 46 of each wing roller supporting bracket 45 is divided into an inner plate 46a and an outer plate 46b. Outer plate 46b is welded to the upper leg 27 of rope clamp 25, as at 70, while upstanding leg 47 has a longitudinally extending slot 48a therein to support the outer end of wing roller dead shaft 42 for longitudinal movement relative thereto. Relative longitudinal movement between the base plates 46a and 46b is facilitated by pitch link 71 pivotally connected to plate 46b and 46a at 72 and 73, respectively.

The use and operation of this invention are as follows:

The idler assembly embodying this invention successfully absorbs constant heavy horizontal loading as well as sudden shock loads without damage or substantial wear at critical places in the idler assembly, such as at bracket ears 52 and pins 53 and 54, for example. This is accomplished, of course, because longitudinal movement of the outer wing rollers and brackets is permitted by its construction and consequently a substantial amount of the horizontal shock is taken up by movement downstream or "give" of the wing roller brackets which also eliminates a great proportion of the bending moments heretofore encountered.

As is readily seen in FIGURES 3–5, horizontal loading on the carrying reach 7 of the belt causes the wing rollers 40 and supporting brackets 45 to shift downstream to a certain extent. This position is illustrated in dotted lines in FIGURES 3 and 4. The center roller, of course, moves downstream also.

FIGURE 5 illustrates a condition in which the assembly has shifted downstream due to a horizontal shock load. In this case the shock load is caused by a rock R striking an idler assembly 6. The horizontal loading creates a tipping moment about pivot point P. The tipping movement of the individual wing roller supporting brackets and consequently the wing rollers is slight, due to the fact that the sliding fit between link 61, elongated rope clamp 25 and supporting bracket 45 is not a precision fit. A wing roller in its supporting bracket are shown in tipped position in solid lines in FIGURE 5 while the dotted line position of the roller shows the normal untipped relationship thereof. Such tipping has an advantageous effect.

When the wing rollers and supporting brackets tip forwardly upon the rope clamps, it will readily be seen that the center roller will tend to move backwardly or upstream. This is due to the fact that the center roller is suspended below the rope clamps in troughing relationship. A slight forwardly canted attitude of the wing rollers is consequently established. This forwardly canted attitude of the wing rollers induces belt training in a well-known manner.

The alternate form of this invention illustrated in FIGURE 6 operates in much the same manner as the form illustrated in FIGURES 1–5, with several exceptions. As was described above, the bracket 45 is divided into two separate base plate members 46a and 46b in the form shown in FIGURE 6. Each plate member 46b is rigidly welded to a corresponding elongated rope clamp 25. As a consequence, when the idler assembly is subjected to horizontal loads, the wing rollers 40 and inner base plate 46a move downstream while the outer ends of the dead shafts 42 slide downstream in slots 48a as pitch links 71 facilitate movement of the major portion of the wing roller supporting brackets 45.

This improved idler assembly for low rope conveyors provides long service life under the most adverse load conditions. Heavy horizontal loads fail to substantially wear or damage any vital parts of the idler assembly.

Each of the forms of this invention is designed to permit a "give" of the entire roller assembly and, as in the case of the embodiment of FIGURES 1–5, the complete roller supporting brackets also. In the form of FIGURE 6, only the major portions of the wing roller supporting brackets move downstream. Regardless of the form of the invention utilized, the results are such as to virtually eliminate bent and spread wing roller supporting bracket ears, enlarged pivot pin holes, bent and deformed pivot pins and, in some instances, even bent roller supporting dead shafts. It will be obvious that considerable service life is added to the life span of each roller assembly while proportionally decreasing the amount of maintenance and down time necessary to maintain a conveyor system employing idler assemblies of this general type.

What has been shown are several alternative forms of this invention. Many changes could be made, or parts replaced or modified, without departing from the theme of the invention, however. Consequently, it is intended that the foregoing description be taken as illustrative only and not definitive, and the scope of the invention should be limited only by the appended claims.

I claim:

1. A shock absorbing troughing idler assembly for use in a wire rope side frame conveyor, said troughing idler assembly including, in combination, a roller assembly, said roller assembly having a pair of wing rollers flanking an intermediate roller or rollers, a frame assembly for each of the wing rollers, said frame assembly including an inner end portion and an outer end portion, means for flexibly connecting the inner end portion of each wing roller and the adjacent end portion of the adjacent intermediate roller to the inner end portion of an associated frame assembly, the outer end portion of each frame assembly supporting the outer end portion of its associated wing roller above the wire ropes, structure for supporting each frame assembly, by its outer end portion, from an associated side frame, connecting structure intermediate the end portions of the frame assembly which provides limited movement of at least the inner end portion of the frame assembly with respect to the supporting structure in the direction of belt travel, said inner end portion of the frame assembly thereby carrying at least the inner end portion of the wing roller associated therewith downstream with respect to the supporting structure and side frame in response to longitudinally imposed shock loads.

2. The shock absorbing troughing idler assembly of claim 1 further characterized in that both the inner and outer end portions of the frame assembly are movable with respect to the supporting structure.

3. The shock absorbing troughing idler assembly of claim 1 further characterized in that the outer end portion of the frame assembly is fixed with respect to the supporting structure.

4. The shock absorbing troughing idler assembly of claim 2 further characterized in that the connecting structure is a shock link assembly, one end of which is flexibly connected to the frame assembly and the other end of which is flexibly connected to the supporting structure.

5. The shock absorbing troughing idler assembly of claim 3 further characterized in that the connecting structure is a shock link assembly pivotally connected to, and joining, the inner and outer end portions of the frame assembly,
   the outer end portion of each inner roller being movable with respect to the outer end portion of its associated supporting frame assembly.

6. The shock absorbing troughing idler assembly of claim 4 further characterized in that the wing roller is supported on a shaft,
   the inner and outer end portions of the frame assembly having generally vertically upwardly extending portions,
   the ends of the wing roller shafts being connected to said generally vertically upwardly extending end portions.

7. The shock absorbing troughing idler assembly of claim 6 further characterized in that the generally vertically upwardly extending portion of the inner end portion of the wing roller frame assembly includes a pair of mounting ears,
   the inner end of the associated wing roller shaft being pin connected to the ears.

8. The shock absorbing troughing idler assembly of claim 7 further characterized in that the adjacent intermediate roller is similarly supported by a shaft,
   the adjacent end of the intermediate roller shaft being pin connected to the ears.

9. The shock absorbing troughing idler assembly of claim 6 further characterized in that the outer end of each wing roller shaft is journaled in the generally upwardly extending portion of the outer end portion of the wing roller frame assembly, and
   the outer end portion of the wing roller frame assembly slides relative to a planar surface on the supporting structure.

References Cited in the file of this patent
UNITED STATES PATENTS

| | | |
|---|---|---|
| 2,868,355 | McCann | Jan. 13, 1959 |
| 2,880,851 | Salmons | Apr. 7, 1959 |
| 2,892,534 | Ogden | June 30, 1959 |
| 2,896,774 | Long et al. | July 28, 1959 |
| 2,904,166 | Stinson | Sept. 15, 1959 |